(12) United States Patent
Arvan

(10) Patent No.: US 8,893,493 B2
(45) Date of Patent: Nov. 25, 2014

(54) ENGINE EXHAUST SYSTEM AND METHOD OF OPERATION

(75) Inventor: Gary J. Arvan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 916 days.

(21) Appl. No.: 12/687,555

(22) Filed: Jan. 14, 2010

(65) Prior Publication Data

US 2011/0167804 A1 Jul. 14, 2011

(51) Int. Cl.
- *F02B 33/44* (2006.01)
- *F02B 37/18* (2006.01)
- *F02M 25/07* (2006.01)
- *F01N 3/035* (2006.01)
- *F02B 37/02* (2006.01)
- *F01N 3/025* (2006.01)

(52) U.S. Cl.
CPC .............. *F02B 37/18* (2013.01); *Y02T 10/121* (2013.01); *F02M 25/0707* (2013.01); *F02M 25/0749* (2013.01); *F01N 3/035* (2013.01); *F02M 25/0712* (2013.01); *F02M 25/0717* (2013.01); *Y02T 10/144* (2013.01); *F02B 37/025* (2013.01); *F01N 3/0253* (2013.01)
USPC ................. 60/605.2; 60/280; 60/286; 60/303

(58) Field of Classification Search
CPC ..... F01N 3/0253; F01N 3/035; F02B 37/025; F02B 37/18; F02M 25/0707; F02M 25/0712; F02M 25/0717; F02M 25/0749; Y02T 10/121; Y02T 10/144
USPC ................................................ 60/280, 605.2
See application file for complete search history.

(56) References Cited

U.S. PATENT DOCUMENTS

| | | | | |
|---|---|---|---|---|
| 4,179,892 A * | 12/1979 | Heydrich | ...................... | 60/605.2 |
| 5,109,668 A * | 5/1992 | Lindstedt | ......................... | 60/310 |
| 5,775,099 A * | 7/1998 | Ito et al. | ........................... | 60/274 |
| 6,324,847 B1 * | 12/2001 | Pierpont | ....................... | 60/605.2 |
| 7,055,311 B2 * | 6/2006 | Beutel et al. | ..................... | 60/285 |
| 7,104,048 B2 * | 9/2006 | Brown | .............................. | 60/286 |
| 7,788,923 B2 * | 9/2010 | Rowells | ........................... | 60/612 |
| 2007/0000237 A1 * | 1/2007 | Toshioka et al. | ................ | 60/285 |
| 2007/0089415 A1 * | 4/2007 | Shimokawa et al. | ......... | 60/605.2 |
| 2012/0023936 A1 * | 2/2012 | Kruiswyk et al. | ............ | 60/605.2 |

FOREIGN PATENT DOCUMENTS

DE 102005021173 A1 11/2006

OTHER PUBLICATIONS

Chinese Office Action for Application No. 201110038524.6 dated Feb. 20, 2013; 13 pages.

* cited by examiner

*Primary Examiner* — Jesse Bogue
*Assistant Examiner* — Matthew T Largi
(74) *Attorney, Agent, or Firm* — Cantor Colburn LLP

(57) ABSTRACT

An exhaust system for a turbocharged internal combustion engine comprises a first exhaust conduit extending between a first engine cylinder and a turbocharger inlet and is configured to conduct exhaust gas therebetween. A second exhaust conduit extends between a second engine cylinder and an in inlet for an exhaust gas recirculation system and is configured to conduct exhaust therebetween. An exhaust gas bypass extends between, and is in fluid communication with, the first and second exhaust conduits and is configured to divert exhaust gas flowing through the second exhaust gas conduit to the first exhaust gas conduit, and the turbocharger inlet, under conditions of varying exhaust gas recirculation demand of the internal combustion engine.

15 Claims, 2 Drawing Sheets

ENGINE EXHAUST SYSTEM AND METHOD OF OPERATION

FIELD OF THE INVENTION

Exemplary embodiments of the present invention relate to engine exhaust systems and, more particularly, to an engine exhaust system for efficiently providing low hydrocarbon ("HC") content exhaust gas to an engine exhaust gas recirculation system while providing high HC content exhaust gas to downstream exhaust system catalysts.

BACKGROUND

The efficient use of recirculated exhaust gas ("EGR") is important to modern internal combustion engines, including both gasoline and diesel fueled engines. Efficient use of EGR generally supports the objectives of realizing high power output from these engines while also achieving high fuel efficiency and economy and while meeting increasingly stringent engine-out emission requirements. The use of forced induction, particularly including exhaust gas driven turbochargers, is also frequently employed to increase the engine intake mass airflow and the power output of the engine by using waste energy derived from the exhaust gas. The efficient use of EGR and turbocharged forced-induction necessitates synergistic design of these systems.

The exhaust gas emitted from an internal combustion engine, particularly a diesel engine, is a heterogeneous mixture that contains gaseous emissions such as carbon monoxide ("CO"), unburned hydrocarbons ("HC"), and oxides of nitrogen ("$NO_x$") as well as condensed phase materials (liquids and solids) that constitute particulate matter. Catalyst compositions typically disposed on catalyst supports or substrates are provided in an engine's exhaust system to convert certain, or all of these exhaust constituents into non-regulated exhaust gas components. An exhaust treatment technology in use for high levels of particulate matter reduction is the diesel particulate filter device ("DPF"). There are several known filter structures used in DPF's that have displayed effectiveness in removing particulate matter from exhaust gas such as ceramic honeycomb wall-flow filters, wound or packed fiber filters, open cell foams, sintered metals, fibers, etc.

The filter structure, regardless of the type used, is a physical structure for removing particulates from the exhaust gas and, as a result, the accumulation of filtered particulates will have the effect of gradually increasing the exhaust system backpressure experienced by the engine. To address backpressure increases caused by the accumulation of exhaust gas particulates, the DPF is periodically cleaned or regenerated. Regeneration of a DPF, particularly in vehicular applications, is typically automatic and is controlled by an engine or other controller based on signals generated by engine and exhaust system sensors. The regeneration event involves increasing the temperature of the DPF filter structure to levels that are often between 500° C. and 650° C. in order to burn the accumulated particulates. One method of generating the temperatures required in the exhaust system for regeneration of the DPF is to deliver unburned HC to an oxidation catalyst device that is disposed upstream of the DPF. The HC may be delivered to the exhaust system by adjusting the fuel injection, timing or both of the engine and "over-fueling" the engine resulting in unburned HC exiting the engine with the exhaust gas and entering the exhaust system. In the alternative, a fuel injector associated with a fuel system may be fluidly connected to the exhaust system upstream of the oxidation catalyst device for delivery of HC directly to the exhaust gas. The HC is oxidized in the oxidation catalyst device resulting in an exothermic reaction that raises the temperature of the exhaust gas to a level sufficient to burn the accumulated particulates in the DPF.

A disadvantage to this method of regeneration is that the inlet for the EGR system is typically upstream of the oxidation catalyst and DPF so that the EGR contains both unburned HC and particulate matter. The delivery of unburned HC to an EGR system may lead to clogging of the system, especially if the EGR system employs an exhaust gas cooler. Additionally, recirculation of HC's through the EGR system and back into the engine intake system reduces the quantity of HC available for DPF regeneration and reduces the fuel efficiency of the engine. One method for avoiding the introduction of unburned HC to the EGR system is to limit engine over-fueling to specific engine cylinders with un-fueled exhaust directed to the EGR system and HC-laden exhaust directed to the DPF during regeneration. In a V-configured engine, the over-fueling may involve one bank of cylinders and in an in-line engine it may involve a group of cylinders (cylinders 1, 2, 3 in an in-line 6 cylinder engine for example). A disadvantage to the above method of over-fueling the engine is that the exhaust flows are permanently separated, resulting in excess un-fueled exhaust bypassing the turbocharger when not required by the EGR system. For improved efficiency, it is desirable to take advantage of the full exhaust flow volume, less that diverted for EGR purposes, to power the turbocharger in an engine using forced induction.

SUMMARY OF THE INVENTION

In an exemplary embodiment, an exhaust system for a turbocharged internal combustion engine comprises a first exhaust conduit extending between, and in fluid communication with, a first engine cylinder and a turbocharger inlet and is configured to conduct exhaust gas from the first engine cylinder to the turbocharger inlet. A second exhaust conduit extends between, and is in fluid communication with, a second engine cylinder and an inlet for an exhaust gas recirculation system and is configured to conduct exhaust gas from the second engine cylinder to the exhaust gas recirculation system. An exhaust gas bypass extends between, and is in fluid communication with, the first and second exhaust conduits and is configured to divert exhaust gas flowing through the second exhaust gas conduit to the first exhaust gas conduit and the turbocharger inlet under conditions of varying exhaust gas recirculation demand of the internal combustion engine.

In another exemplary embodiment, a method for regenerating an exhaust gas particulate filter in an exhaust system for a turbocharged internal combustion engine having a first exhaust conduit extending between, and in fluid communication with, a first engine cylinder and a turbocharger inlet and configured to conduct exhaust gas from the first engine cylinder to the turbocharger inlet, a second exhaust conduit extending between, and in fluid communication with, a second engine cylinder and an in inlet for an exhaust gas recirculation system and configured to conduct exhaust gas from the second engine cylinder to the exhaust gas recirculation system and an exhaust gas bypass extending between, and in fluid communication with, the first and second exhaust conduits and configured to divert exhaust gas flowing through the second exhaust gas conduit to the first exhaust gas conduit and the turbocharger inlet under conditions of varying exhaust gas recirculation demand of the internal combustion engine is disclosed. The method comprises adjusting the fuel delivery rate, the timing or both of the engine to selectively include a higher level of hydrocarbon in the exhaust gas from the first engine cylinder, passing the hydrocarbon enriched exhaust gas and the diverted exhaust gas through the turbocharger, oxidizing the hydrocarbon in the hydrocarbon enriched exhaust gas downstream of the turbocharger to thereby heat the exhaust gas, and passing the heated exhaust gas through an exhaust gas particulate filter to combust carbon and particulates trapped therein.

The above features and advantages, and other features and advantages of the invention are readily apparent from the following detailed description of the best invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
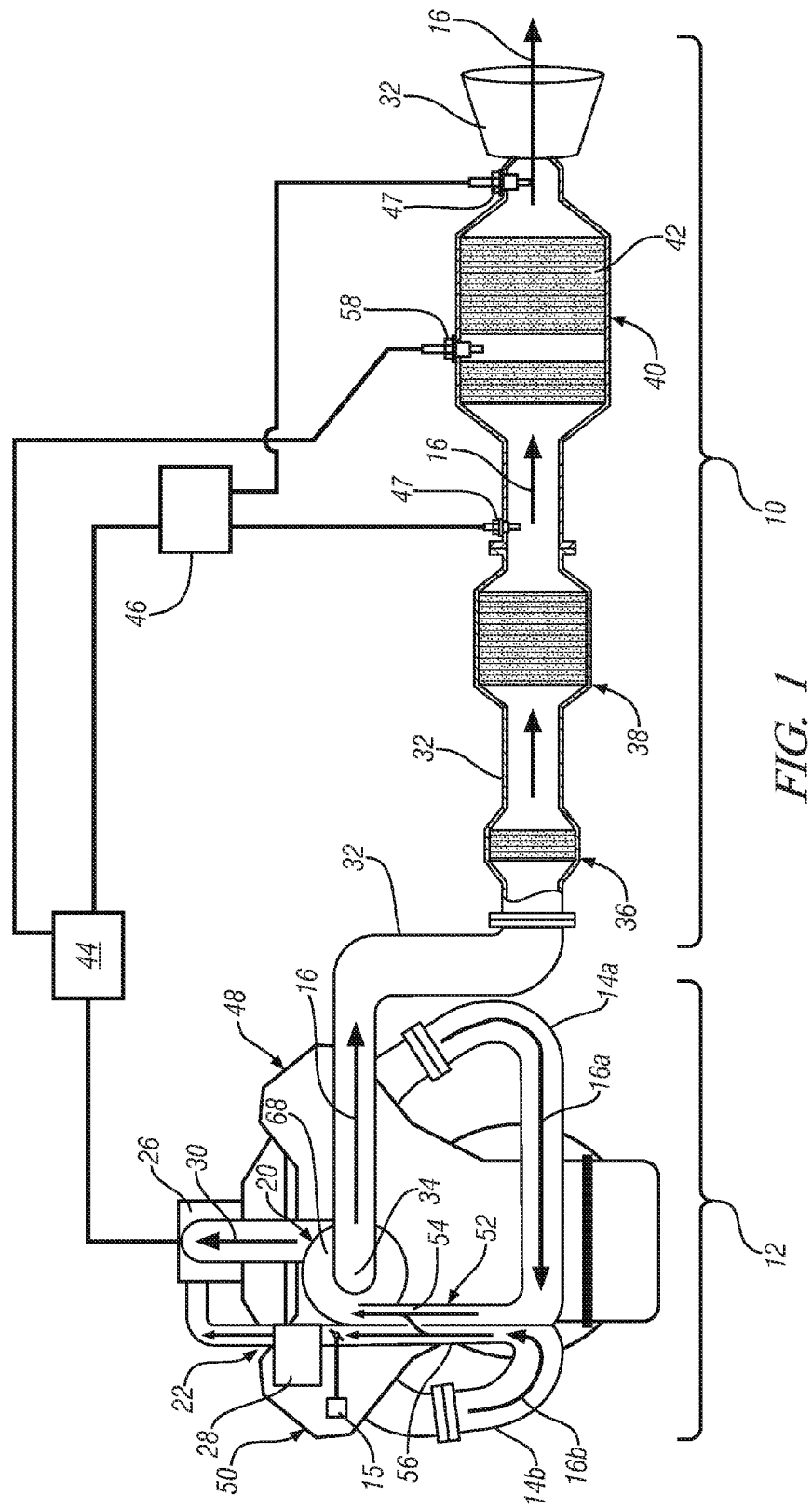
FIG. 1 is schematic view of an exhaust gas treatment system for an internal combustion engine.

The following description is merely exemplary in nature and is not intended to limit the present disclosure, application or uses. It should be understood that throughout the drawings, corresponding reference numerals indicate like or corresponding parts and features.

Referring now to FIG. 1, an exemplary embodiment of the invention is directed to an exhaust system, referred to generally as 10, for application to an internal combustion engine, such as diesel engine 12. It is appreciated that the diesel engine 12 is merely exemplary in nature and that the invention described herein can be implemented in various engine systems. For ease of description and discussion, the disclosure will be discussed in the context of a diesel engine.

Figure 2:
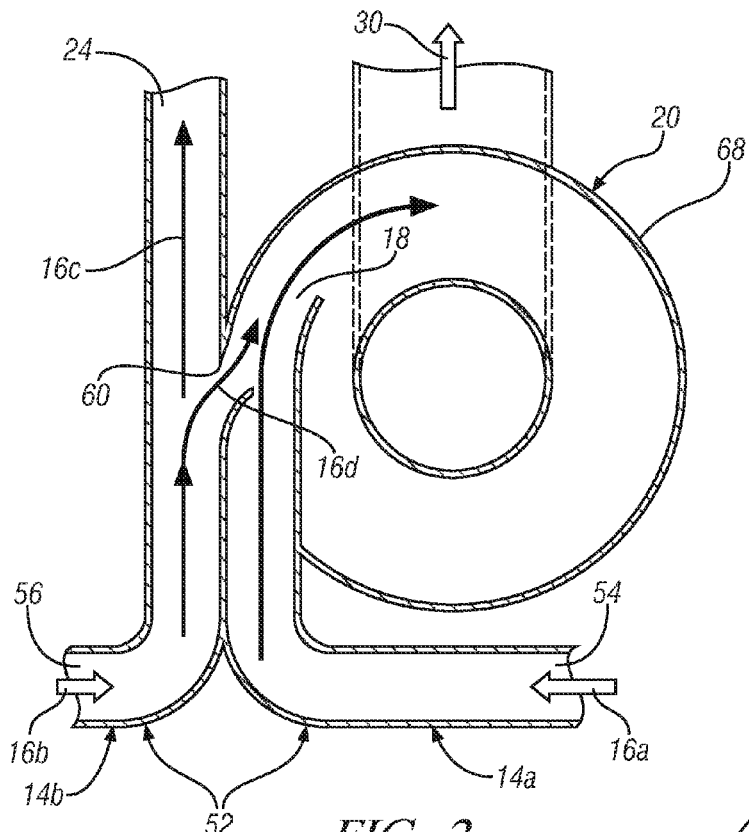
FIG. 2 is a schematic view of a turbocharger and associated inlet runners embodying features of the present invention.

In an exemplary embodiment, as illustrated in FIGS. 1 and 2, the exhaust system 10 includes first and second exhaust conduits 14a and 14b that are in fluid communication with exhaust ports (not shown) of the diesel engine 12. The first exhaust conduit 14a is configured to collect and to conduct an exhaust gas flow 16a from a first cylinder or bank of cylinders 48, of the engine 12 and to the inlet 18, FIG. 2, of an exhaust driven turbocharger 20. The second exhaust conduit 14b is configured to collect and to conduct an exhaust gas flow 16b from a second cylinder or bank of cylinders 50, of the engine 12 and to the inlet 24 of an exhaust gas recirculation system ("EGR") 22. The turbocharger 20 utilizes excess exhaust energy to compress inlet air 30 which is delivered to the intake manifold 26 of the diesel engine 12. A portion 16c of the exhaust gas flow 16b is diverted from second exhaust conduit 14b and is delivered to the EGR system 22 where it is may pass through exhaust gas cooler 28 and is subsequently mixed with the compressed inlet air 30 from turbocharger 20 prior to being introduced into the intake manifold 26 of the engine 12. The volume of the EGR exhaust gas 16c that is diverted from the second exhaust conduit 14b is regulated by an EGR valve 15 that is located in the EGR system 22 between the exhaust conduit 14b and the intake manifold 26 of the engine 12.

The remainder of the exhaust system 10 includes an exhaust gas conduit 32 in fluid communication with the outlet 34 of the turbocharger 20 and comprises several segments that function to transport the exhaust gas flow 16 to various exhaust treatment components of the exhaust system 10. The exhaust treatment components may include an oxidation catalyst such as first, diesel oxidation catalyst ("DOC") 36 that is useful in treating unburned gaseous and non-volatile HC and CO, which are oxidized to form carbon dioxide and water. The oxidation of the HC in the DOC 36 is an exothermic reaction which will be discussed in further detail below. A selective catalyst reduction device ("SCR") 38 may be disposed downstream of the DOC 36 and is configured to convert $NO_x$ constituents in the exhaust gas flow 16 in the presence of a reductant such as ammonia ("$NH_3$").

In an exemplary embodiment, an exhaust gas particulate filter, in this case a diesel particulate filter ("DPF") 40 is located within the exhaust system 10, downstream of the SCR 38 and DOC 36 and operates to filter the exhaust gas flow 16 of carbon and other particulates. The DPF 40 may be constructed using a ceramic wall-flow monolith exhaust gas filter 42 having walls through which the exhaust gas flow 16 is forced to migrate. It is through the wall-flow mechanism that the exhaust gas flow 16 is filtered of carbon and other particulates. The filtered particulates are deposited within the exhaust gas filter 42 of the DPF 40 and, over time, will have the effect of increasing the exhaust gas back pressure experienced by the diesel engine 12. The increase in the backpressure of the exhaust gas flow 16 caused by the accumulation of particulate matter in the DPF 40 requires that the DPF be periodically cleaned, or regenerated, in order to maintain the efficiency of the diesel engine 12. Regeneration involves the oxidation or burning of the accumulated carbon and other particulates in what is typically a high temperature (>600° C.) environment.

Referring again to FIG. 1, a controller such as engine controller 44 is operably connected to, and monitors, the exhaust system 10 through a number of sensors such as differential pressure sensor 46 that monitors the pressure differential between a plurality of signally connected pressure sensors 47. As used herein, the term controller refers to an application specific integrated circuit (ASIC), an electronic circuit, a processor (shared, dedicated or group) and memory that executes one or more software of firmware programs, a combinational logic circuit, and/or other suitable components that provide the described functionality. Upon a determination that the exhaust system backpressure has reached a predetermined level indicative of the need to regenerate the DPF 40, the engine controller 44 will adjust the delivery rate and/or the timing (or both) to provide unburned HC to exhaust system 10, by the use of a fuel injector located within exhaust system 10 (not shown) or excess fuel delivery to the diesel engine 12. In the example shown in FIG. 1, in which the engine cylinders are in a V-configuration, a first bank of cylinders 48 will be over-fueled resulting in the delivery of unburned HC to the exhaust gas flow 16a transiting the first exhaust conduit 14a. A second bank of cylinders 50 will continue to receive fuel at a normal rate and quantity and, as a result the exhaust gas flow 16b in second exhaust conduit 14b will not have a high level of unburned HC resident therein.

Referring now to FIG. 2, the exhaust system portion 52 adjacent the inlet of the turbocharger 20 is illustrated schematically. The exhaust system portion 52 comprises the outlet end 54 of the first exhaust conduit 14a and the outlet end 56 of the second exhaust conduit 14b. The outlet end 54 transfers the exhaust flow 16a directly to the turbocharger inlet 18.

During regeneration of the DPF 40, the HC laden exhaust gas flow 16a from the first cylinder or bank of cylinders 48 of the diesel engine 12 will pass directly through the turbocharger 20. Subsequent to the exit of the HC enriched exhaust gas 16a from the turbocharger outlet 34, FIG. 1, the exhaust gas flow 16 will be conducted to and through the DOC 36 where it will be subject to oxidation. Since the oxidation reaction is exothermic, the exhaust gas flow 16 will be re-heated or elevated prior to its receipt by the DPF 40, thereby facilitating regeneration of the DPF 40. A temperature sensor 58, also in communication with engine controller 44, will allow the controller to adjust the over-fueling of the first cylinder or bank of cylinders 48 in order to maintain the temperature of the DPF 40 at an appropriate level for complete combustion of the carbon and particulates trapped in the exhaust gas filter 42.

The outlet end 56 of the second exhaust conduit 14b transfers the exhaust flow 16b directly to the inlet 24 of the EGR system 22. During regeneration of the DPF 40, the exhaust gas flow 16b from the exhaust conduit 14b will not be over-fueled and, as such, the flow entering the EGR system 22 from outlet end 56 of the second exhaust conduit 14b will be less likely to cause blockage or otherwise damage the EGR system 22. During operation of the diesel engine 12, the volume of recirculated exhaust gas, and thus the portion of exhaust gas flow 16b, required by the engine 12 will vary based on the engine load, speed and other variables. As a result, the portion of exhaust gas flow 16b that is not needed to meet recirculated exhaust gas requirements, namely excess exhaust gas flow 16d, will be diverted through exhaust gas bypass 60 extending between the first and second exhaust conduits 14a and 14b. As the flow rate in the EGR system 22 varies based on the exhaust gas volume demands of the engine 12, excess exhaust gas flow 16d will exit the second exhaust conduit 14b through the exhaust gas bypass 60 and flow through the first exhaust gas conduit 14a and the turbocharger 20 thereby increasing exhaust system efficiency by increasing the total flow volume of exhaust gas 16 through the turbocharger 20 under varying operating modes.

Figure 3:
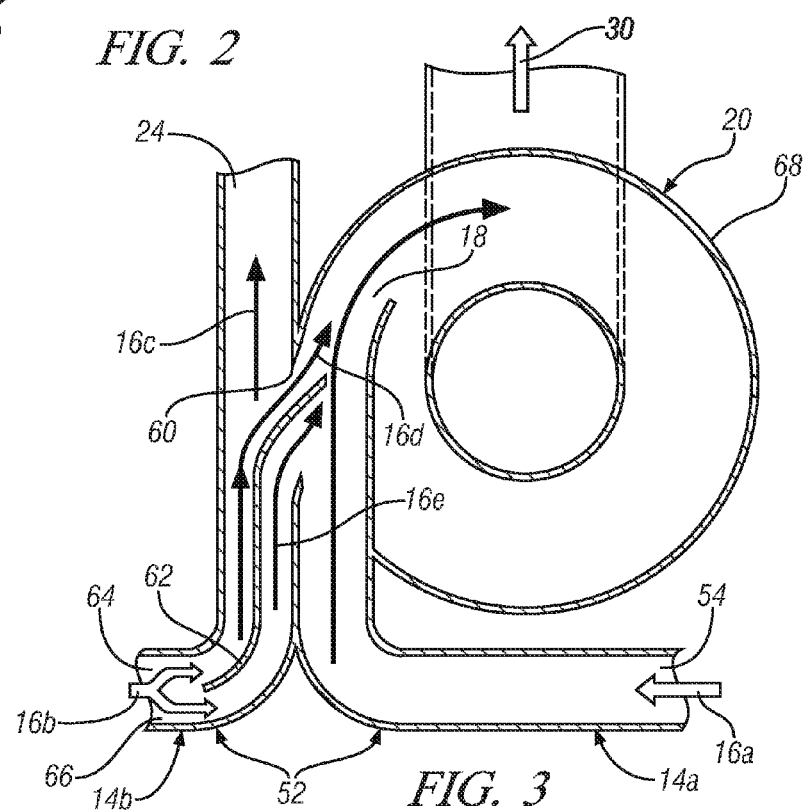
FIG. 3 is a schematic view of another embodiment of a turbocharger and associated inlet runners embodying features of the present invention.

In another exemplary embodiment shown in FIG. 3, the second exhaust conduit 14b includes a flow divider 62 that extends through most of the length thereof. The flow divider 62 defines first and second flow passages 64 and 66, respectively. The first flow passage 64 conducts the exhaust flow 16c into the inlet 24 of the EGR system 22. During regeneration of the DPF 40, the exhaust gas flow 16b from the second exhaust conduit 14b will not be over-fueled and as such the flow entering the EGR system 22 will be less likely to cause blockage or otherwise damage the EGR system. The second flow passage 66 conducts the flow 16e directly to the first exhaust conduit 14a for delivery to turbocharger inlet 18. The cross-sectional area and, as a result, the maximum flow volume of the first flow passage 64 is determined by the calculated maximum exhaust gas recirculation of the diesel engine 12 which, in this case is less than the full exhaust flow 16b in the second exhaust conduit 14b. The earlier, upstream fluid communication of the second flow passage 66 with the first exhaust conduit 14a facilitates more even exhaust flow characteristics at the turbocharger inlet 18 and more efficient operation of the turbocharger 20 as a result.

During operation of the diesel engine 12, the volume demand of recirculated exhaust gas will vary based on the engine load, speed and other variables. As a result, exhaust gas flow through first flow passage 64 will vary. In order to make use of the maximum exhaust gas energy for driving the turbocharger 20, an exhaust gas bypass 60 is located in the flow divider 62 and serves to establish fluid communication with the exhaust gas in the first exhaust conduit 14a. As the flow rate in the first flow passage 64 varies based on the exhaust gas volume demands of the EGR system 22, excess exhaust gas flow 16d will exit the first flow passage 64 through the exhaust gas bypass 60 and flow through the first exhaust conduit 14a and the turbocharger 20 thereby increasing exhaust system efficiency.

While the description has focused on an exhaust system portion 52 that is closely associated with the turbocharger 20 and that may be integrated with the turbocharger housing 68, it is contemplated that the exhaust system portion 52 may be placed at a location upstream of the turbocharger, shown schematically in FIG. 1, in order to simplify the design and construction thereof. Such a placement should not be considered to deviate from, or fall outside of, the scope of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust system for a turbocharged internal combustion engine comprising:
    a first exhaust conduit extending between, and in fluid communication with, a first engine cylinder and a turbocharger inlet and configured to conduct exhaust gas from the first engine cylinder to the turbocharger inlet;
    a second exhaust conduit extending between, and in fluid communication with, a second engine cylinder and an inlet for an exhaust gas recirculation system and configured to conduct exhaust gas from the second engine cylinder to the exhaust gas recirculation system;
    an exhaust gas bypass extending between, and in fluid communication with, the first and second exhaust conduits and configured to divert exhaust gas flowing through the second exhaust conduit to the first exhaust conduit and the turbocharger inlet under conditions of varying exhaust gas recirculation demand of the internal combustion engine;
    a flow divider extending within the second exhaust conduit to define a first flow passage and a second flow passage, the first flow passage being in fluid communication with the inlet of the exhaust gas recirculation system and in fluid communication with the first exhaust conduit, and the second flow passage being in fluid communication with the first exhaust conduit;
    an exhaust gas particulate filter disposed for receiving exhaust gas flowing from the first engine cylinder;
    one or more sensors disposed and configured for indicating whether a backpressure in the exhaust system has exceeded a predetermined level; and
    an engine controller operatively connected to the one or more sensors and to a fuel delivery system for delivering fuel to the first engine cylinder and the second engine cylinder;
    wherein the engine controller is configured to determine, based at least in part on the backpressure in the exhaust system, whether regeneration of the exhaust gas particulate filter is required;

wherein the engine controller is further configured to deliver fuel to the second engine cylinder at a rate and quantity associated with normal operation of the second engine cylinder without regard for whether regeneration of the exhaust gas particulate filter is required; and wherein the engine controller is further configured to deliver fuel to the first engine cylinder at a rate and quantity associated with not only operation of the second engine cylinder, but also regeneration of the exhaust gas particulate filter, whenever regeneration of the exhaust gas particulate filter is required.

2. The exhaust system for a turbocharged internal combustion engine of claim 1, wherein the exhaust gas from the first engine cylinder selectively includes a higher level of a hydrocarbon than the exhaust gas from the second engine cylinder.

3. The exhaust system for a turbocharged internal combustion engine of claim 2, wherein the exhaust gas from the first engine cylinder passes through the turbocharger and is re-heated through oxidation of the hydrocarbon in an oxidation catalyst downstream thereof.

4. The exhaust system for a turbocharged internal combustion engine of claim 3, further comprising:
a diesel particulate filter downstream of, and in fluid communication with, the oxidation catalyst and configured to receive the re-heated exhaust gas for combustion of particulates trapped therein.

5. The exhaust system for a turbocharged internal combustion engine of claim 1, wherein the first exhaust conduit and the second exhaust conduit are integral with a housing of the turbocharger.

6. The exhaust system for a turbocharged internal combustion engine of claim 1, further comprising:
the flow divider configured such that the first flow passage has a cross-sectional area that is sized to provide a maximum flow volume that is determined by a maximum exhaust recirculation flow volume of the internal combustion engine.

7. The exhaust system for a turbocharged internal combustion engine of claim 6, wherein the first exhaust conduit and the second exhaust conduit and flow divider are integral with a housing of the turbocharger.

8. The exhaust system for a turbocharged internal combustion engine of claim 1, wherein the first engine cylinder comprises a plurality of first engine cylinders and the second engine cylinder comprises a plurality of second engine cylinders.

9. The exhaust system for a turbocharged internal combustion engine of claim 6, wherein the exhaust gas bypass extends between, and is in fluid communication with, the first flow passage and the first exhaust conduit and is configured to divert exhaust gas flowing through the first flow passage to the first exhaust conduit and the turbocharger inlet under conditions of varying exhaust gas recirculation demand of the internal combustion engine.

10. A method for regenerating an exhaust gas particulate filter in an exhaust system for a turbocharged internal combustion engine having a first exhaust conduit extending between, and in fluid communication with, a first engine cylinder and a turbocharger inlet and configured to conduct exhaust gas from the first engine cylinder to the turbocharger inlet, a second exhaust conduit extending between, and in fluid communication with, a second engine cylinder and an inlet for an exhaust gas recirculation system and configured to conduct exhaust gas from the second engine cylinder to the exhaust gas recirculation system and an exhaust gas bypass extending between, and in fluid communication with, the first and second exhaust conduits and configured to provide a diverted exhaust gas flowing through the second exhaust conduit to the first exhaust conduit and the turbocharger inlet under conditions of varying exhaust gas recirculation demand of the internal combustion engine, comprising:
determining whether regeneration of the exhaust gas particulate filter is required;
delivering fuel to the second engine cylinder at a rate and quantity associated with normal operation of the second engine cylinder without regard for whether regeneration of the exhaust gas particulate filter is required;
whenever regeneration of the exhaust gas particulate filter is required, adjusting a fuel delivery rate, a fuel delivery timing or both of the engine to selectively provide a hydrocarbon-enriched exhaust gas from the first engine cylinder having a higher level of a hydrocarbon than the exhaust gas from the second cylinder;
using a flow divider extending within the second exhaust conduit, in connection with the exhaust gas bypass, to divert exhaust gas flowing through the second exhaust conduit to the first exhaust conduit the flow divider defining a first flow passage and a second flow passage, the first flow passage being in fluid communication with the inlet of the exhaust gas recirculation system and in fluid communication with the first exhaust conduit;
passing the hydrocarbon-enriched exhaust gas and the diverted exhaust gas through the turbocharger,
oxidizing the hydrocarbon in the hydrocarbon enriched exhaust gas downstream of the turbocharger to thereby re-heat the exhaust gas and provide a reheated exhaust gas; and
passing the heated exhaust gas through an exhaust gas particulate filter to combust carbon and particulates trapped therein.

11. The method for regenerating an exhaust gas particulate filter in an exhaust system for a turbocharged internal combustion engine of claim 10,
further comprising monitoring the temperature of the exhaust gas and adjusting a fuel delivery rate, a fuel delivery timing or both of the engine to maintain a selected temperature in the exhaust gas particulate filter.

12. The exhaust system of claim 1, wherein the second exhaust conduit defines a second exhaust conduit length, and wherein the flow divider extends for most of the second exhaust conduit length.

13. The exhaust system of claim 1, wherein the flow divider has a fixed geometry that is configured so as to prevent exhaust gas flowing through the first exhaust conduit from entering the second exhaust conduit.

14. The exhaust system of claim 1, wherein the flow divider has a fixed geometry that is configured so as to conduct all exhaust gas flowing through the first exhaust conduit to the turbocharger inlet.

15. The exhaust system of claim 1, wherein the second flow passage is configured to conduct at least a portion of the exhaust gas flowing through the second exhaust conduit directly to the first exhaust conduit.

\* \* \* \* \*